United States Patent [19]

Ezis et al.

[11] Patent Number: 5,723,392
[45] Date of Patent: *Mar. 3, 1998

[54] IN-SITU GROWN WHISKER REINFORCED CERAMICS

[75] Inventors: Andre Ezis; C. James Shih, both of Vista, Calif.

[73] Assignee: Cercom, Inc., Vista, Calif.

[*] Notice: The terminal 13 months of this patent has been disclaimed.

[21] Appl. No.: 264,330

[22] Filed: Jun. 23, 1994

[51] Int. Cl.$^6$ ................................. C04B 35/577
[52] U.S. Cl. ................... 501/92; 501/97; 501/95
[58] Field of Search ................... 501/89, 97, 92, 501/95

[56] References Cited

U.S. PATENT DOCUMENTS

| | | | |
|---|---|---|---|
| 4,863,881 | 9/1989 | Ahrens et al. | 501/992 |
| 5,132,257 | 7/1992 | Kodama et al. | 501/92 |
| 5,160,508 | 11/1992 | Pyzik et al. | 501/97 X |
| 5,196,386 | 3/1993 | Furrse et al. | 501/92 X |
| 5,200,373 | 4/1993 | Yasufomi et al. | 501/92 X |
| 5,358,912 | 10/1994 | Freitag et al. | 501/97 |

*Primary Examiner*—Karl Group
*Attorney, Agent, or Firm*—H. Jay Spiegel

[57] ABSTRACT

In-situ $Si_3N_4$ whisker growth mechanisms have enhanced the microstructure of ceramic materials such as SiC through controlled growth of elongated beta-type Silicon Nitride grains. During liquid phase sintering at temperatures not exceeding 1850° C., alpha-type Silicon Nitride dissolves into the liquid phase and reprecipitates as an elongated or acicular beta modification. The $Si_3N_4$ reinforced microstructures can be formed by the controlled recrystallization of beta-type Silicon Nitride. In-situ whisker growth is enhanced or optimized through the use of thermal treatments and/or additions of seed materials. Finely divided beta-type Silicon Nitride particles which are insoluble in the liquid phase during sintering, and therefore have been used to provide nucleation sites for whisker growth are employed. Thermal treatments have been designed to promote directional growth (elongation) as opposed to development of less elongated type grains.

5 Claims, 7 Drawing Sheets

A(3000X)    B(1000X)

IN-SITU GROWN WHISKER REINFORCED CERAMICS

BACKGROUND OF THE INVENTION

Silicon Carbide is an exceptionally hard, corrosion and erosion resistant ceramic material. It has been recognized as a potential candidate material for many structural applications due to its unique combination of positive attributes such as, for example, excellent oxidation, corrosion and wear resistance as well as high hardness. Silicon Carbide is also known for its superior, high temperature mechanical properties such as strength retention and creep resistance.

Despite these positive attributes, the range of potential applications for Silicon Carbide material is severely limited due to deficiencies resulting from poor fracture toughness, inadequate thermal shock resistance and, accordingly, lack of total reliability.

Prior investigations have demonstrated that the fracture toughness of polycrystalline ceramics can be improved significantly through reinforcement with single crystal ceramic whiskers. For example, it has been reported that the addition of SiC whiskers not only improved the thermal shock resistance ($\Delta T_c$) of $Al_2O_3$ from 300° to 1000° C. but also improved its strength and reliability as measured by Weibull modulus calculations.

When whiskers are employed to reinforce ceramic materials, the reinforced regions dissipate energy during crack propagation. The efficiency of the reinforcement is dependent upon the physical and mechanical characteristics of the reinforcement, reinforcement loading and/or the nature of the reinforcement/matrix bonding. Matrix chemistry, reinforcement surface properties and processing parameters are primary considerations for the development of optimum interface conditions. It is important to understand that reinforcement will not prevent catastrophic failure of so reinforced ceramic materials, however, such reinforcement will effectively increase the stress threshold necessary to initiate a graceful failure.

In the prior art, it is known to reinforce ceramic materials through the use of whiskers which are pre-formed and are thereafter blended with the ceramic matrix powder during the manufacture of the ceramic material. Such processes have been difficult to carry out successfully because the tendency is for the whiskers to agglomerate, that is, for the whiskers to mix with the ceramic matrix powder non-uniformly, with some regions of the ceramic matrix powder having a high density of whiskers and other regions of the ceramic matrix powder having a low density of whiskers. Such non-uniformity of distribution of pre-formed whiskers within the ceramic matrix powder results in a corresponding non-uniformity in the final finished ceramic material with a concurrent lack of homogeneity of the final ceramic product and differing performance characteristics of the finished ceramic material at different regions thereof. Applicants have found that it is not feasible to obtain uniformity of dispersion of a desired amount of pre-formed whiskers within a ceramic matrix. Applicants have found that as the % by weight of whiskers within the entire powder mix increases, clumping of whiskers increases. Within desirable ranges of % by weight pre-formed whisker addition, clumping is evident. Furthermore, quantities of pre-formed whiskers always include particulates mixed therein which, though made of the same material as the whiskers, materially affect the reinforcing ability thereof. This problem is an inherent result from the pre-formed whisker manufacturing process. Additionally, pre-formed whiskers as a raw material source are very expensive and usually cost more than $1,000/Kg.

In order to attempt to achieve more uniform homogeneity, that is, more uniform distribution of pre-formed whiskers within the ceramic material, it has been found that it is necessary to process the ceramic matrix powder/whisker composition using wet procedures concurrently with chemical treatments to achieve deflocculation and/or flocculation and to thereby preclude sedimentation.

In a further aspect, attempts have been made to employ methods such as turbo milling and high shear grinding to attempt to prevent whisker agglomeration and to attempt to uniformly distribute whiskers throughout the mixture. Turbo milling has been shown to be effective in homogenizing powder/whisker constituents and in improving the whisker characteristics. Other methods have been employed such as colloidal processing, chemical preparation of the powder and mixing in solution. Results are uncertain, at best. These methods fail to (1) effectively prevent agglomeration of whiskers and (2) uniformly distribute whiskers throughout the mixture.

In a further aspect, pre-formed whiskers are generally single crystals with a whisker diameter between 0.5 and 2.0 micrometers and an aspect ratio (length to diameter ratio) between 8 and 40. Whisker materials of this size and shape are known to be carcinogenic upon inhalation. Therefore, they represent a considerable health hazard and can be compared to asbestos-type materials in this regard. Whiskers must be handled with care, protective clothing and breathing devices are required. Growing whiskers in-situ, as accomplished in accordance with the teachings of the present invention, mitigates these problems.

Accordingly, a need has evolved to develop a method of reinforcement of ceramic materials through the use of whiskers, which method is reproducible, maintains homogeneity and uniform distribution of whiskers throughout the ceramic material is inexpensive and presents no health hazards, and, thus, provides the improvements in ceramic material performance for which the use of whisker reinforcements has shown great promise. This goal is an important aspect of the development of the present invention.

Ideally, the fabrication method should incorporate in-situ growth to preclude handling of pre-formed whiskers and use a material additive such as a particle as a precursor to in-situ growth. Powder particles are relatively inexpensive, easy to process and handle, making them more attractive as an additive than whiskers, platelets, etc.

With the decision made to develop a cost effective whisker reinforced ceramic material having an appropriate whisker population uniformly distributed throughout the ceramic matrix, it is important to develop an effective method of fabricating such a material. Due to the low diffusivity resulting from covalent bonding, SiC cannot be densified without the use of additives. As is known, solid state sintering of SiC is usually performed at temperatures above 2000° C. As is also known, typical additives used in solid state sintering process include elemental Boron, Boron compounds, Aluminum compounds and Beryllium compounds. These additives are generally employed in combination with elemental Carbon. At the temperatures at which solid state sintering is conducted, Applicants have found that severe degradation of known whisker reinforcement materials will inevitably occur, thereby defeating the purpose for whisker reinforcement. In this regard, a particularly effective finished ceramic material consists of Silicon Carbide (SiC) having reinforcements consisting of Silicon Nitride ($Si_3N_4$) whiskers. However, Applicants have found that if sintering temperatures exceed 1850° C., the Silicon Nitride particles, precursors for reinforcing whiskers tend to be unstable. Furthermore, sintering temperatures below 1850° C. have been found, by Applicants, to be favored to produce a fine, uniform microstructure having SiC grains averaging, at most, 1 micrometer. That is, exaggerated grain growth is generally not observed below 1850° C. Such a microstructure is required in order to maintain good mechanical properties, to enhance reliability and to produce intergranular failure which deters fracture propagation and improves toughness. As such, a need has developed for a process for manufacture of whisker reinforced ceramic materials having a sintering step which takes place at or below 1850° C.

It is with these goals in mind that the present invention was developed.

The following prior art is known to Applicant:

In Volume 62, Number 7–8 of the Journal of American Ceramic Society, July–August, 1979, B. R. Lawn and D. B. Marshall proposed a ratio $H/K_{IC}$ as an index of "brittleness" where H is the hardness, or resistance to deformation and $K_{IC}$ is toughness, or resistance to fracture. In the article, the authors indicate that all materials are more susceptible to deformation in small-scale loading events and such materials are more susceptible to fracture in large-scale events. Such events are somewhat predictable based upon the hardness and toughness of the subject material. Thus, by normalizing the characteristic dimensions of the two competing processes and the contact load in terms of the appropriate functions of H and $K_{IC}$, the authors have developed a universal deformation/fracture diagram. This diagram has since been employed to predict the mechanical response of any material of known hardness and toughness for any prospective in-service contact loading conditions. While this disclosure has nothing to do with the specific invention disclosed herein, the ratio $H/K_{IC}$ was employed by Applicants in determining the effectiveness of the finished ceramic materials disclosed herein.

In the Ceramic Bulletin, Volume 64, Number 2 (1985), George C. Wei and Paul F. Becher disclosed dense, toughened SiC whisker reinforced ceramic matrices. These materials were created using hot pressing procedures carried out on powders having pre-formed whiskers mixed therein. The authors describe hot pressing procedures conducted at temperatures ranging from 1250° C. to 2000°. The present invention differs from the teachings of Wei and Becher as contemplating growing of single crystal whiskers in-situ from particle precursors and of the use of liquid phase sintering techniques carried out at temperatures below 1850° C.

U.S. Pat. No. 4,543,345 to George C. Wei and the corresponding Reissue U.S. Pat. No. Re. 32,843 disclose ceramic composites, particularly $Al_2O_3$, mullite or $B_4C$ reinforced with pre-formed SiC whiskers. The present invention is distinct from the teachings of Wei in several respects. Firstly, Applicants herein disclose growing of single crystal whiskers in-situ from particle precursors. Secondly, Wei excludes SiC from consideration as a ceramic matrix material (column 3, lines 21–31). Furthermore, Wei acknowledges the inherent clumping of pre-formed whiskers which is eliminated when they are formed in-situ.

In a 1985 article by T. N. Tiegs and P. F. Becher titled "Whisker Reinforced Ceramic Composites", the authors disclose whisker reinforced ceramics wherein the whiskers are pre-formed and are intermixed and dispersed within the ceramic powder prior to high temperature processing. The authors describe hot pressing in a graphite dye at temperatures up to 1850° C. The present invention differs from the teachings of Tiegs and Becher as contemplating growth of whiskers in a ceramic material in-situ from particle precursors along with liquid phase sintering at temperatures below 1850° C.

In 1987, Messrs. Becher and Tiegs had an article published in the Engineered Materials Handbook, Volume 1, titled "Whisker-Reinforced Ceramics". This paper fails to teach in-situ grown whiskers nor the use of liquid phase sintering at below 1850° C. as disclosed herein.

SUMMARY OF THE INVENTION

The present invention relates to an in-situ grown $Si_3N_4$ whisker reinforced SiC based ceramic matrix and method of making.

Development of in-situ whisker growth mechanisms has primarily focused on the Silicon Nitride ($Si_3N_4$) material system wherein enhanced microstructure can be achieved through controlled growth of elongated beta-type Silicon Nitride grains. During sintering for a sufficient and observable time period, which depends upon the composition of the liquid phase sintering media and its melting point, the liquid phase sintering media melts whereupon the alpha-type Silicon Nitride dissolves into the liquid phase therein and reprecipitates as an elongated or acicular beta modification. Typically, the alpha-type Silicon Nitride so dissolves within the range of one to thirty minutes after the liquid phase sintering media combines and melts. The $Si_3N_4$ reinforced microstructures can be formed by the controlled recrystallization of beta-type Silicon Nitride.

From a technical standpoint, in-situ whisker growth is enhanced or optimized through the use of thermal treatments and/or additions of seed materials. Finely divided beta-type Silicon Nitride particles which are insoluble in the liquid phase during sintering, and therefore have been used to provide nucleation sites for whisker growth may be employed in the proportion of up to 10% by weight of the alpha-type $Si_3N_4$ particles. Thermal treatments have been designed to promote directional growth (elongation) as opposed to development of less elongated type grains.

Due to its unique microstructure, monolithic Silicon Nitride can be viewed as a self-reinforced or as an in-situ grown whisker composite. The process for densifying $Si_3N_4$ is a form of liquid phase sintering which may be described as solution/recrystallization. During sintering and upon recrystallization, beta-type Silicon Nitride develops an acicular morphology producing a microstructure with enhanced fracture toughness.

Applicants have discovered that certain self-reinforcement events, that is, whisker growth, that occur in $Si_3N_4$ can also be made to occur in SiC. Applicants have also discovered that when $Si_3N_4$ particles are added to a mix of SiC that has been compounded for liquid phase sintering at temperatures less than 1850° C., that upon sintering, the alpha-type $Si_3N_4$ will go into solution with the liquid phase sintering additives and, upon further thermal processing, will recrystallize as beta-type $Si_3N_4$ acicular grains (whiskers) dispersed within a Silicon Carbide matrix.

Applicants have further discovered that the beta-type Silicon Nitride whiskers formed within the Silicon Carbide act as reinforcing agents and improve the fracture toughness (resistance to cracking) as compared to unreinforced Silicon Carbide bodies. The concept of providing in-situ reinforcement to Silicon Carbide bodies has never before been demonstrated. In its preferred form, the material formed may be described as a SiC matrix composite material containing beta-type $Si_3N_4$ whisker reinforcements.

In a further aspect, Applicants have discovered that the volume percent of $Si_3N_4$ particles added to the SiC mix will determine the degree or volume percent of beta-type Silicon Nitride in-situ whisker growth.

Applicants have further discovered that the use of heat treatments and seeding techniques increase the efficiency of beta-type $Si_3N_4$ whisker growth in-situ. Furthermore, Applicants have discovered that the $Si_3N_4$ particles of the alpha polytype will only yield the desired acicular growth, during thermal processing of the SiC body in the form of beta-type in-situ formed whiskers. Applicants have found that if the $Si_3N_4$ particles are initially of the beta-type, the same acicular whiskers do not, in fact, form. However, where alpha-type Silicon Nitride particles have been mixed into the Silicon Carbide, and a small percentage addition of beta-type Silicon Nitride particles is also added, such addition of a small percentage of beta-type Silicon Nitride particles may well serve as seeding materials to help facilitate the whisker growth mechanism. As such, this small percentage addition of beta-type Silicon Nitride particles may, in some fashion, be regarded as the addition of a "catalyst" or seed.

In developing the inventive process, Applicants investigated potential reinforcement phases for Silicon Carbide ceramics, wherein additions of alpha-type Silicon Nitride particles were used in conjunction with Yttrium Oxide $(Y_2O_3)$/Aluminum Oxide $(Al_2O_3)$ formulations as sintering aids. The results which accrued demonstrate that melts of $Y_2O_3/Al_2O_3$ significantly lower sintering temperature requirements and accelerate densification of Silicon Carbide. Furthermore, Applicants discovered that $Y_2O_3/Al_2O_3$ based liquids promote Silicon Nitride phase transformation and development of acicular beta-type $Si_3N_4$ grains during thermal processing. Additionally, Applicants found that beta-type $Si_3N_4$ whiskers can be successfully formed within a SiC matrix.

Where eutectic or near eutectic liquid phase sintering was employed, the temperature required to achieve full material density was significantly reduced and did not exceed 1850° C. Furthermore, when liquid phase sintering was employed, in-situ beta-type $Si_3N_4$ whisker growth occurred while an effective submicron SiC microstructure (matrix) was created. The materials created using the inventive process exhibit exceptionally good fracture toughness with fractures progressing intergranularly.

Accordingly, it is a first object of the present invention to provide in-situ grown whisker reinforced SiC ceramics as well as the method of making such ceramics wherein the whiskers are uniformly distributed.

It is a further object of the present invention to provide such an invention wherein the processing takes place at temperatures below the stability temperature of $Si_3N_4$ and generally not exceeding 1850° C.

It is a still further object of the present invention to provide such an invention wherein the method thereof includes the use of a liquid phase sintering process.

It is a yet further object of the present invention to provide Silicon Carbide ceramic materials reinforced with Silicon Nitride whiskers grown in-situ.

It is a still further object of the present invention to provide such a process wherein liquid phase sintering aid compositions such as Yttrium Oxide, or other rare earth oxides, Aluminum Oxide and Silicon Dioxide are employed.

Further, those trained in the art will also recognize that the chemistries described herein as related to SiC may also be found operative in other material systems such as $B_4C$, TaC, TiC, TiN, etc. The requisite requirement is that the system be liquid phase sinterable below about 1850° C., that alpha-type $Si_3N_4$ be soluble in the liquid phase sintering aid material and that beta-type $Si_3N_4$ have the ability to recrystallize from the same liquid.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
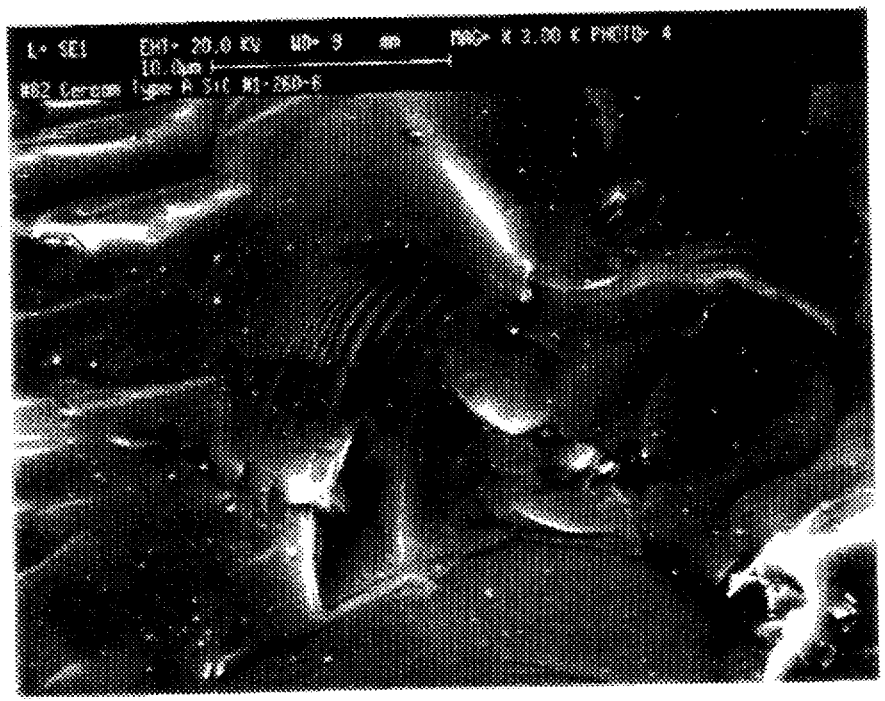
FIG. 1 shows a photomicrograph of a Silicon Carbide fracture surface processed conventionally using hot pressing at 2100° C. and 3000 p.s.i.

With reference, first, to FIG. 1, a photomicrograph depicts the fracture surface of a Silicon Carbide material which was processed conventionally using Boron compounds and Carbon and a hot pressing procedure at 2100° C. and 3,000 psi. As shown, the microstructure of this solid state diffusionally processed Silicon Carbide material is generally coarse and exaggerated with some grains measuring in excess of 50 micrometers. As is known, SiC grains greater than about 7 micrometers customarily exhibit transgranular fracture. The dominant fracture mode shown in FIG. 1 is, in fact, transgranular, representative of low fracture toughness and low reliability.

In contrast to conventional sintering aids that promote solid state kinetics, as one aspect of the present invention, Applicants have found that the use of certain eutectic or near-eutectic formulations as liquid phase sintering aids can lead to improved properties for both monolithic and composite materials. When eutectic sintering aid compositions are employed, due to their low melting temperatures, materials consolidate at lower temperatures and grains do not tend to grow or become exaggerated. Additionally, in order to facilitate manufacture of Silicon Carbon composite materials, sintering must generally occur at a temperature no greater than 1850° C., particularly, where the Silicon Carbide matrix is being reinforced with $Si_3N_4$. The 1850° C. limitation, in this example, is vital since the $Si_3N_4$ will sublimate above this temperature (assuming ambient $N_2$ pressure).

Furthermore, Applicants have found that greater resistance to fracture results where the microstructure of the finished ceramic material has an average grain size no greater than 1 micrometer. Applicants have found that when sintering temperatures are maintained at a temperature no greater than 1850° C., maintenance of grain microstructure at an average size of 1 micrometer or less is economically feasible.

In the development of the present invention, Applicants found that $Y_2O_3$, $Al_2O_3$ and $SiO_2$ are promising liquid phase, sintering aid compositions for use in the manufacture of Silicon Carbide material.

Applicants also determined that the $Y_2O_3/Al_2O_3/SiO_2$ liquid is appropriate for the dissolution of alpha-type $Si_3N_4$ particles. Therefore, when $Si_3N_4$ particles are added to the SiC powder batch containing $Y_2O_3/Al_2O_3$ as a sintering aid, these particles go into solution during thermal processing (sintering) and recrystallize within the SiC matrix as beta-type $Si_3N_4$ grains—acicular, elongated or whisker type in shape. What was discovered by Applicants was that $Si_3N_4$ solution/recrystallization also occurs within a SiC matrix material during sintering—similar to that which occurs in $Si_3N_4$. The time periods for these processes to occur are the same as those described in the SUMMARY OF THE INVENTION.

Through experimentation, Applicants have found that the eutectic composition of $4Y_2O_3.6Al_2O_3$ has a melting temperature of about 1760° C., which temperature may be further reduced through the addition of $SiO_2$. Applicants have found that all or part of the $SiO_2$ requirement can be met through employment of the intrinsic oxidation product ($SiO_2$) which is found on all Silicon Carbide powder surfaces. Accordingly, in the development of the present invention, Applicants have employed $Y_2O_3/Al_2O_3/SiO_2$ compositions as liquid phase sintering additions.

Figure 2:
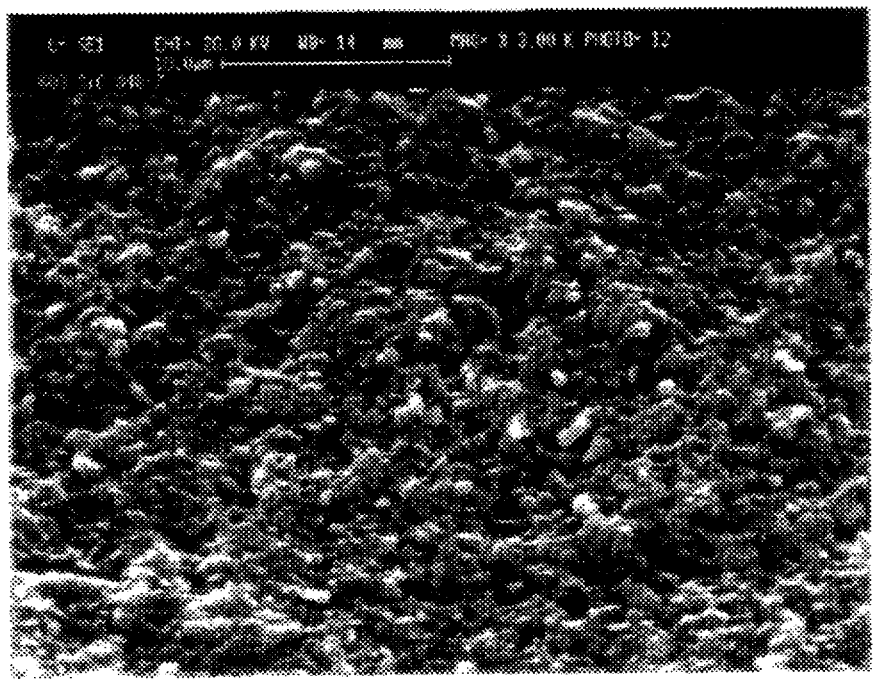
FIG. 2 shows a photomicrograph of eutectic liquid phase sintered Silicon Carbide showing primarily intergranular fracture.

FIG. 2 shows a photomicrograph of a non-reinforced eutectic liquid-phase sintered Silicon Carbon material having an average measured grain size of approximately 1 micrometer. The Silicon Carbide material shown in FIG. 2 was created through liquid phase sintering processing at 1750° C. and 3,000 psi employing a $Y_2O_3/Al_2O_3/SiO_2$ composition as the liquid phase sintering addition. In testing the finished material, Applicants found that the average flexural strength as measured by four point bend is in excess of 650 MPa (94 ksi) and the fracture toughness as determined by micro-indentation is approximately 4.8 $MPa.m^{1/2}$. In contrast to these figures, conventionally processed monolithic Silicon Carbide such as that which is illustrated in FIG. 1 typically yields strengths below 425 MPa (62 ksi) and a fracture toughness at or below 3.0 $MPa.m^{1/2}$.

Of note, in FIG. 2, is the intergranular nature of crack propagation which demonstrates an increased resistance to such crack propagation and, therefore, increased fracture toughness and strength over and above the material illustrated in FIG. 1. The use of eutectic liquid phase sintering such as disclosed herein results in reduced temperatures for sintering to achieve full density of material, effective development of sub-micron microstructure, as well as compositional and thermal processing flexibility suitable for developing in-situ whisker growth mechanisms.

TABLE I

Mechanical Properties of SiC, both in Monolithic and Composite form.

| | Average Strength MOR ksi | Weibull Modulus m | Fracture Toughness $K_{IC}$ MPA $m^{1/2}$ | Hardness $H_{KN}$ $Kg/mm^2$ | Index of Brittleness $H_{KN}/K_{IC}$ $(m^{1/2})$ | Critical Flaw Size C* (m) |
|---|---|---|---|---|---|---|
| Conventional SiC (Solid State) | 60.0 | 8 | 3.0 | 2930 | 9.5 | 1.3 |
| Liquid Phase SiC | 104.0 | 18 | 4.9 | 2160 | 4.3 | 6.4 |
| SiC—SiC(w) | 90.7 | 20 | 4.5 | 2440 | 5.3 | 4.2 |
| SiC—SiC(pl) | 61.2 | 20 | — | — | — | — |
| SiC—$Si_3N_4$(w) | 77.7 | 14 | 5.8 | 2110 | 3.6 | 9.4 |
| SiC—$Si_3N_4$(p) | 93.1 | 15 | 6.2 | 2040 | 3.2 | 11.5 |

(w) = whisker; (pl) = platelet; (p) = particulate

Figure 3:
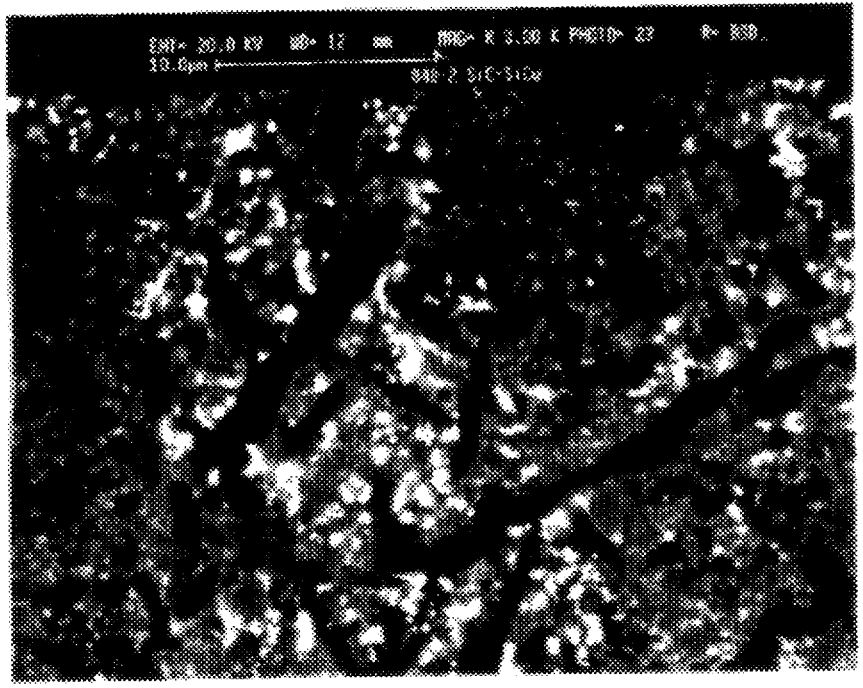
FIG. 3 shows the polished surface microstructure for a Silicon Carbide material reinforced with Silicon Carbide whiskers.

Through further experimentation, Applicants found that it is possible to improve the fracture toughness and general performance of Silicon Carbide materials such as those illustrated in FIGS. 3–8 through the further provision of addition of reinforcement materials such as whiskers ($Si_3N_4$ or SiC), platelets (SiC) or particulate $Si_3N_4$ materials. Table I shows the results of Applicants' experimentation in this regard with the first material described as "Conventional SiC (solid state)" corresponding to the material illustrated in FIG. 1, and with the material described as "SiC-Liquid Phase" being the material illustrated in FIG. 2. The other examples set forth in Table I, to-wit, the incorporation of reinforcement such as platelets, whiskers and particulates, all comprise pre-formed reinforcements which are subsequently mixed into the powder mix and homogenized therein. Thus, FIG. 3 shows the polished surface microstructure (BSE) for a Silicon Carbide material with Silicon Carbide pre-formed whiskers mixed therein in a composite material. This material is depicted in Table I as the third material.

Figure 4:
FIG. 4 shows a photomicrograph of Silicon Carbide ceramic material reinforced with Silicon Carbide platelets.

FIG. 4 shows a photomicrograph of the typical fracture surface for a Silicon Carbide material reinforced with Silicon Carbide pre-formed platelets. This material is the fourth material listed in Table I.

Figure 5:
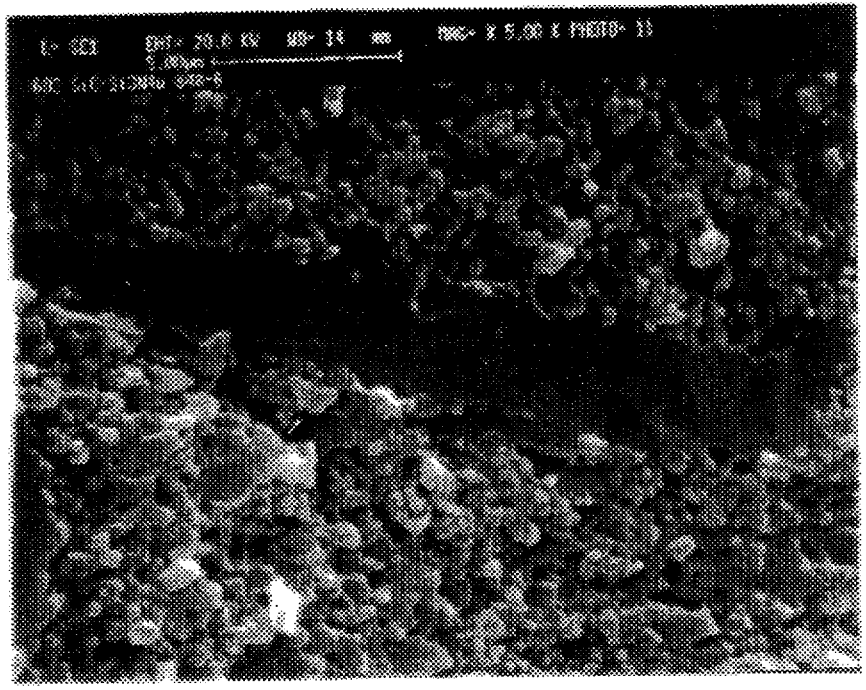
FIG. 5 shows a SEM photomicrograph of a fracture surface for a Silicon Carbide material reinforced with Silicon Nitride whiskers.

FIG. 5 shows a typical fracture surface photomicrograph of a Silicon Carbide material reinforced with Silicon Nitride pre-formed whiskers. This material is the fifth material listed in Table I.

Figure 7:
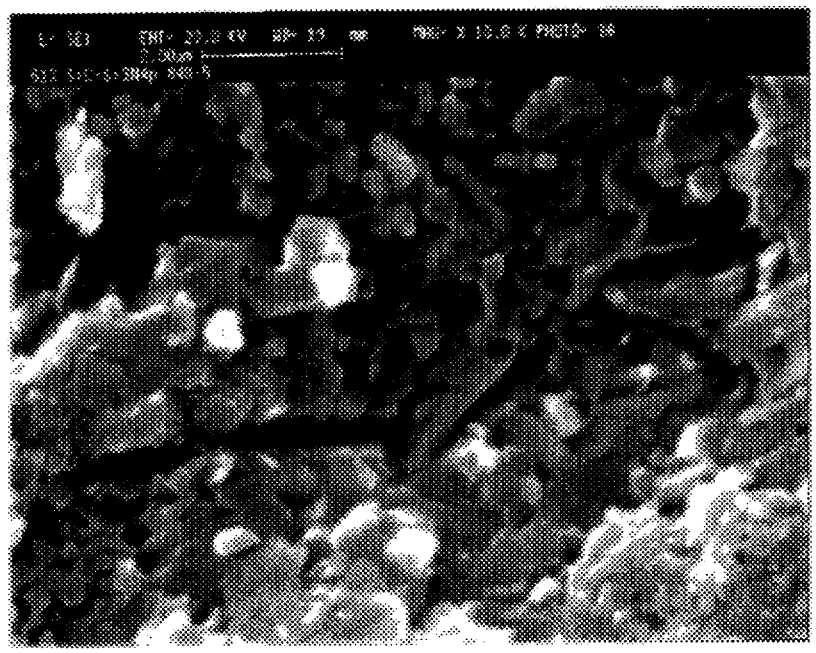
FIGS. 7, 8A and 8B show photomicrographs of a Silicon Carbide material having beta Silicon Nitride whiskers formed in-situ.
Figure 8:
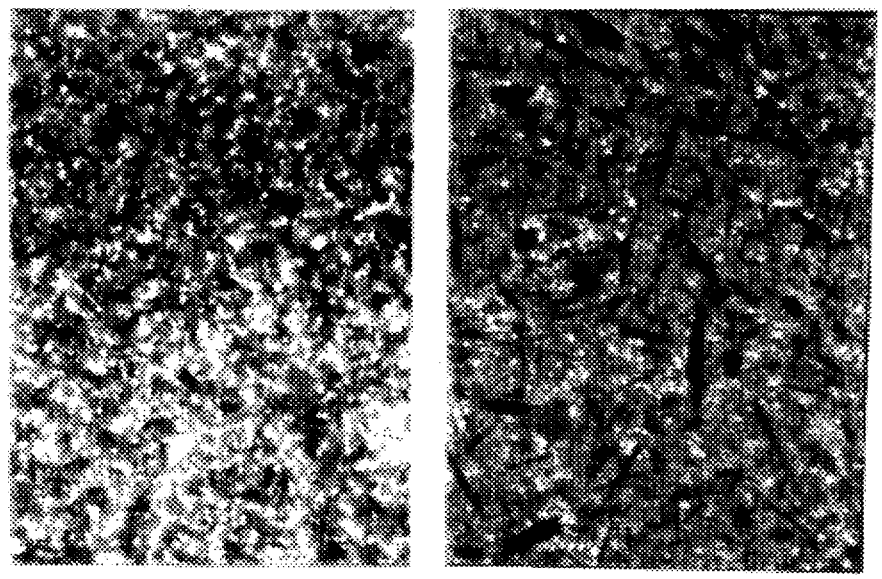

FIGS. 7 and 8 show typical microstructures of an in-situ reinforced SiC material produced using alpha-type $Si_3N_4$ particles and $Y_2O_3/Al_2O_3$ sintering additions. The FIG. 7 material is the sixth material listed in Table I. FIG. 7 is a SEM image of a fractured cross-section whereas FIG. 8 is a compilation of two separate BSE micrographs (A and B) of polished surfaces. Each BSE image represents a different set of sintering conditions.

However, analysis of the samples of materials illustrated in FIGS. 3, 4, 5 and 6 all showed non-homogeneous regions, an undesirable feature, where reinforcing material agglomerated in small areas, thus providing non-uniform dispersion of reinforcing materials such as whiskers or platelets. In contrast, the microstructure for the FIGS. 7 and 8 material is generally homogeneous, relating directly to relative ease of dispersing powder components (particles) uniformly during processing.

Of particular note in Table I is the fact that the fracture toughness is highest for the composites containing Silicon Nitride reinforcements. In fact, as shown in Table I, the measured toughness values are similar to those obtained for premium grades of monolithic Silicon Nitride. Thus, these results as well as strength and thermal shock resistance results strongly suggest that Silicon Carbon with Silicon. Nitride reinforcement can rival monolithic Silicon Nitride as an engineering material.

In a further aspect, pre-manufacturing the Silicon Nitride whiskers is perhaps 10 to 20 times more costly than manufacturing the Silicon Nitride reinforcements in-situ from particulate addition. Despite this disparity in price, the Silicon Nitride particulate showed a higher fracture toughness as shown in Table I.

Preformed Silicon Nitride whisker composites, especially those having whiskers with diameters in excess of one micrometer, exhibit cleavage fracture along the whisker axis as shown in FIG. 5 with the failure appearing to initiate at the tips of the whiskers. Therefore, it would appear that preformed $Si_3N_4$ whiskers cannot accommodate the differences in thermal expansion between the SiC matrix and $Si_3N_4$ whiskers during thermal processing. Although significant toughness improvements are noted, this failure mode would serve to be limiting especially since most commercially available pre-formed $Si_3N_4$ whisker lots contain a significant percentage of whiskers having diameters in excess of one micrometer. Fracture surface analysis shows that in-situ formed whiskers do not fail by fracturing along the whisker axis but fail in compliance with whisker reinforcement theory. That is, toughening mechanisms are visibly operative in that whisker pull out can be evidenced.

FIGS. 7 and 8 show typical photomicrographs of a fractured surface and a polished cross-section, respectively, for a Silicon Carbide material reinforced with in-situ formed Silicon Nitride whiskers. Again, these materials were initiated with the use of alpha-type $Si_3N_4$ particles with selected densification aids. As shown, random whisker beta-type Silicon Nitride grains formed during the sintering step; sizes, shapes and whisker distribution are largely dependent upon type and length of thermal processing. Most of these grains measured approximately 0.5 micrometers in diameter and approximately 3 micrometers in length as shown in FIGS. 7 and 8B. Additionally, larger needle-type beta-type Silicon Nitride grains having diameters of about 2 micrometers and lengths of up to 30 micrometers can also be noted. FIG. 8A was processed using sintering conditions which resulted in the development of sub-micrometer whiskers. These extremely fine whiskers can be enhanced to sizes shown in FIG. 8B by increasing thermal processing time.

As demonstrated in FIG. 7, Applicants have found that development of in-situ whisker growth mechanisms can be focused on the SiC material system where an enhanced microstructure can be achieved by controlling growth of elongated beta-type Silicon Nitride grains within a SiC matrix. Additionally, the figure is an excellent illustration of an active whisker pull-out mechanism, a necessary requirement for composites.

Through experimentation, Applicants have found that, during SiC sintering, alpha-type Silicon Nitride dissolves into the liquid phase and reprecipitates as a beta modification. Through controlled recrystallization of beta-type Silicon Nitride, whisker reinforced SiC matrix microstructures are formed.

In forming Silicon Carbide materials with in-situ formed Silicon Nitride whiskers, alpha-type Silicon Nitride particles were thoroughly mixed and homogenized into a Silicon Carbide mix and were used in conjunction with $Y_2O_3/Al_2O_3$ formulations as sintering aids. Experimentation led to the conclusion that $Y_2O_3/Al_2O_3$ sintering aid formulations melt at significantly lower sintering temperatures (below 1850° C.) while accelerating densification of materials. Furthermore, Applicants have found that the use of $Y_2O_3/Al_2O_3$ formulations for liquid sintering process promotes Silicon Nitride phase transformation. Through experimentation, as demonstrated in FIGS. 7 and 8, Applicants have successfully formed Silicon Nitride whiskers in-situ within a Silicon Carbide matrix.

Figure 6:
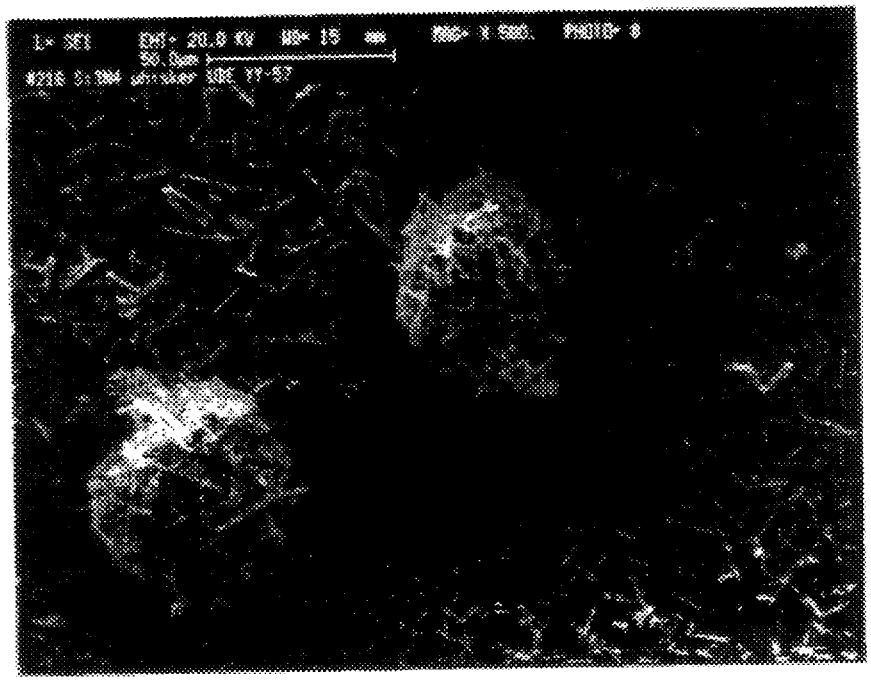
FIG. 6 shows a SEM image of a SiC composite material processed with pre-formed $Si_3N_4$ whiskers.

Comparisons of FIGS. 5 and 6 to 7 and 8 show the differences between the use of pre-formed whiskers used to reinforce Silicon Carbide material and the use of in-situ formed Silicon Nitride whiskers in Silicon Carbide material. FIGS. 5 and 6 materials generally show a non-uniform distribution of the pre-formed whisker reinforcements, including evidence of agglomeration (FIG. 6). Despite this, since the material illustrated in FIG. 5 was manufactured employing a liquid sintering process, the pre-formed whiskers retained substantially their original size and shape indicating that the lower temperatures of liquid phase sintering techniques limited damage to pre-formed whiskers. The randomly dispersed whisker agglomerates generally found in FIG. 6 type materials have been found to form, due to electrostatic charging, as well as incomplete or improper powder homogenization techniques. Applicants have found that it is not completely feasible to homogenize pre-formed whiskers within a powder mix nor to completely eliminate agglomeration.

In contrast, FIGS. 7 and 8 show photomicrographs of Silicon Carbide materials with Silicon Nitride particles added thereto. Therein, $Si_3N_4$ particles are evenly dispersed (homogenized) during conventional powder processing. Needle-like beta-type Silicon Nitride grains are clearly evident with the majority of the in-situ formed beta-type Silicon Nitride whiskers being small and short, about 0.5 micrometers in diameter and about 2 micrometers in length. A few large in-situ formed beta-type whiskers up to about 15 micrometers in length are also evident.

Applicants wish to stress that prior art reinforcement techniques such as adding of pre-formed whiskers of Silicon Carbide and Silicon Nitride or platelets of Silicon Carbide to Silicon Carbide ceramic materials do indeed improve the fracture toughness of the Silicon Carbide over and above that which would be expected with unreinforced Silicon Carbide. However, the inventive methods provide distinct advantages over methods which employ the use of pre-formed reinforcement substances. Firstly, the health risks which exist when human beings handle pre-formed whiskers or platelets are not present where particles are mixed with Silicon Carbide and methods are conducted to facilitate creation of reinforcements in-situ. Furthermore, as explained above, pre-formed reinforcements are extremely expensive to manufacture. The inventive methods disclosed herein reduce these costs dramatically since the expenses involved in creation of particles which will later grow into in-situ whiskers are dramatically lower than the costs for pre-forming whiskers, platelets and other reinforcements.

In a further aspect, the inventive methods disclosed herein are advantageous in the area of homogeneity since Applicants have found that it is easier to uniformly disperse particle precursors to whiskers than it is to disperse pre-formed reinforcements, mainly due to the particular sizes and shapes of the pre-formed reinforcements as compared to the nature and structure of particles which are precursors to the reinforcements.

Table I shows the average flexural strengths (MOR) and Weibull moduli for Silicon Carbide-based composites. As shown, the Silicon Carbide material with in-situ grown Silicon Nitride whiskers (the sixth material listed) has an average strength of 93.1 ksi (although strengths in excess of 130 ksi have been achieved for some compositions), a Weibull modulus of 15, fracture toughness of 6.2, a hardness of 2040, an index of brittleness of 3.2 and critical flaw size of 11.5. With reference to Table I, it is clear that eutectic Silicon Carbide, with its small average grain size is much stronger than the conventionally fabricated Silicon Carbide. The results displayed in Table I indicate that the addition of Silicon Carbide whiskers does not improve the toughness of the matrix material, however, the hardness does increase by about 15%. However, the use of Silicon Nitride whiskers and particles as reinforcements for Silicon Carbide ceramics results in excellent composites with improved toughness.

The index of brittleness displayed in Table I is that which is described hereinabove in the BACKGROUND OF THE INVENTION section of this application, concerning the Lawn and Marshall publication. Based upon that publication, the index of brittleness is a practical parameter for comparing ceramics and leads to a definition of a maximum flaw size ($C^*$) that a solid can sustain under stress without the onset of fracture. The data displayed in Table I indicate that the eutectic Silicon Carbide matrix material has a much larger maximum critical flaw size than conventional Silicon Carbide material. The addition of Silicon Nitride whiskers or particles (which result in in-situ formed beta-type Silicon Nitride whiskers) significantly improves the maximum critical flaw size and, therefore, the reliability of Silicon Carbide. Such improvements in the properties and characteristics of Silicon Carbide material through the use of in-situ grown beta-type Silicon Nitride whiskers expands the engineering use of Silicon Carbide-based materials and provides the confidence for use of such materials in demanding structural applications.

Figure 9:
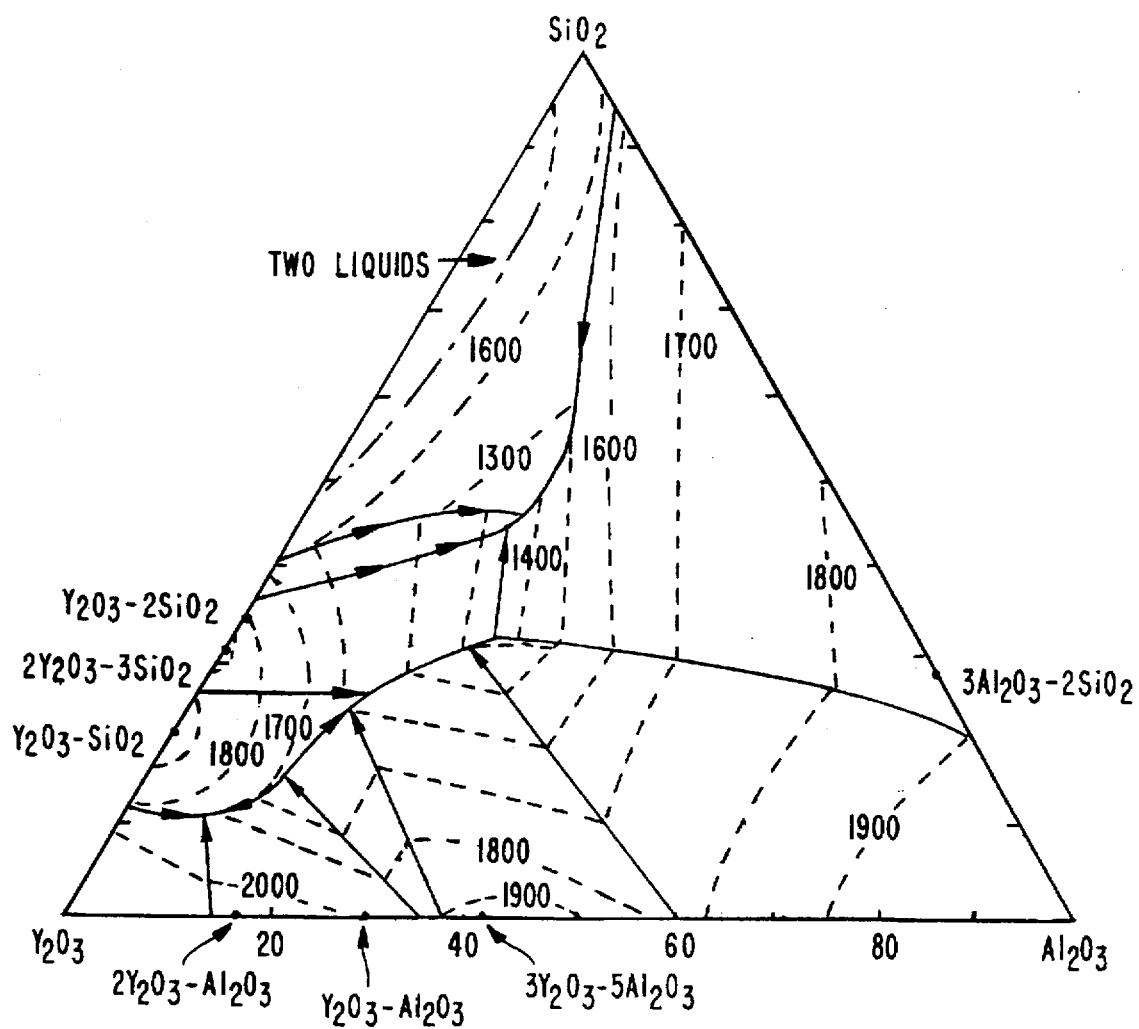
FIG. 9 shows a Ternary phase diagram of Yttrium Oxide, Aluminum Oxide and Silicon Oxide.

FIG. 9 shows a Ternary phase diagram of $Y_2O_3/Al_2O_3/SiO_2$ and gives compositions that can facilitate liquid phase sintering at temperatures no greater than 1850° C. For example, a $Y_2O_3$ alumina rich eutectic (60% $Al_2O_3$/40% $Y_2O_3$) forms a liquid at 1760° C. In the presence of $SiO_2$, that melting temperature decreases as $SiO_2$ content increases.

Figure 10:
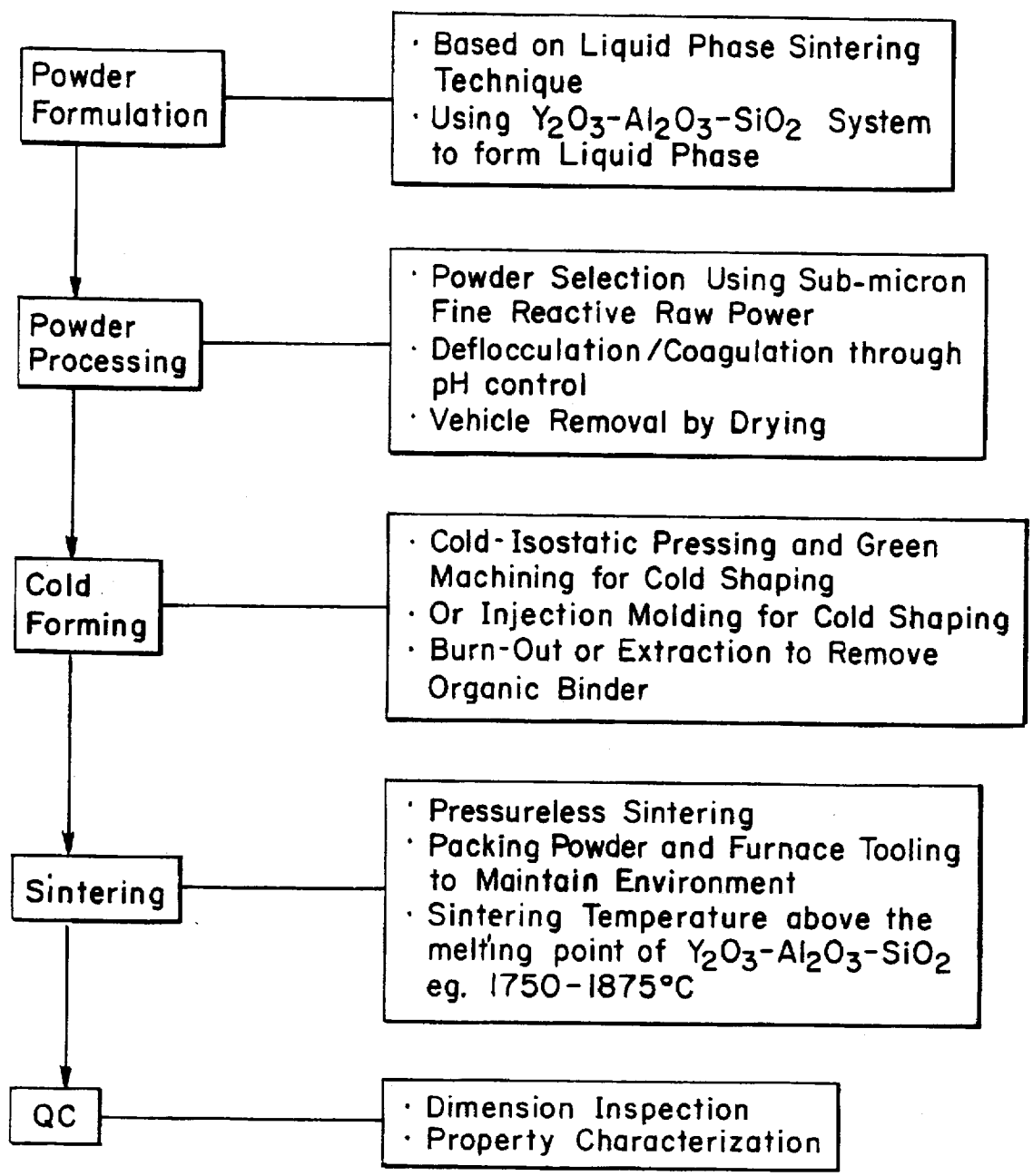
FIGS. 10 and 11 show flowcharts for respective embodiments of the inventive process including the use of liquid phase sintering.

FIG. 10 shows a flowchart of a first process employed in accordance with the teachings of the present invention to grow in-situ formed Silicon Nitride whisker reinforced Silicon Carbide materials.

In the flowchart of FIG. 10, the powder selection is made using sub-micron fine reactive raw powder. The process illustrated in FIG. 10 is based upon liquid phase sintering technique employing the $Y_2O_3$-$Al_2O_3$-$SiO_2$ system to form the liquid phase for the sintering step. Pressureless sintering is employed with a sintering temperature above the melting point of $Y_2O_3$-$Al_2O_3$-$SiO_2$, that is, 1750°–1875° C. In this process, cold-isostatic pressing and green machining for cold shaping are employed. It is noted that sintering or densification are achieved without the use of mechanical energy. Therefore, the process allows for net-shape fabrication but does require finely divided active powders for sintering and the use of packing or cover powders to develop a required localized atmosphere. Additionally, larger amounts of liquid phase sintering additives may be required to achieve full density.

Figure 11:
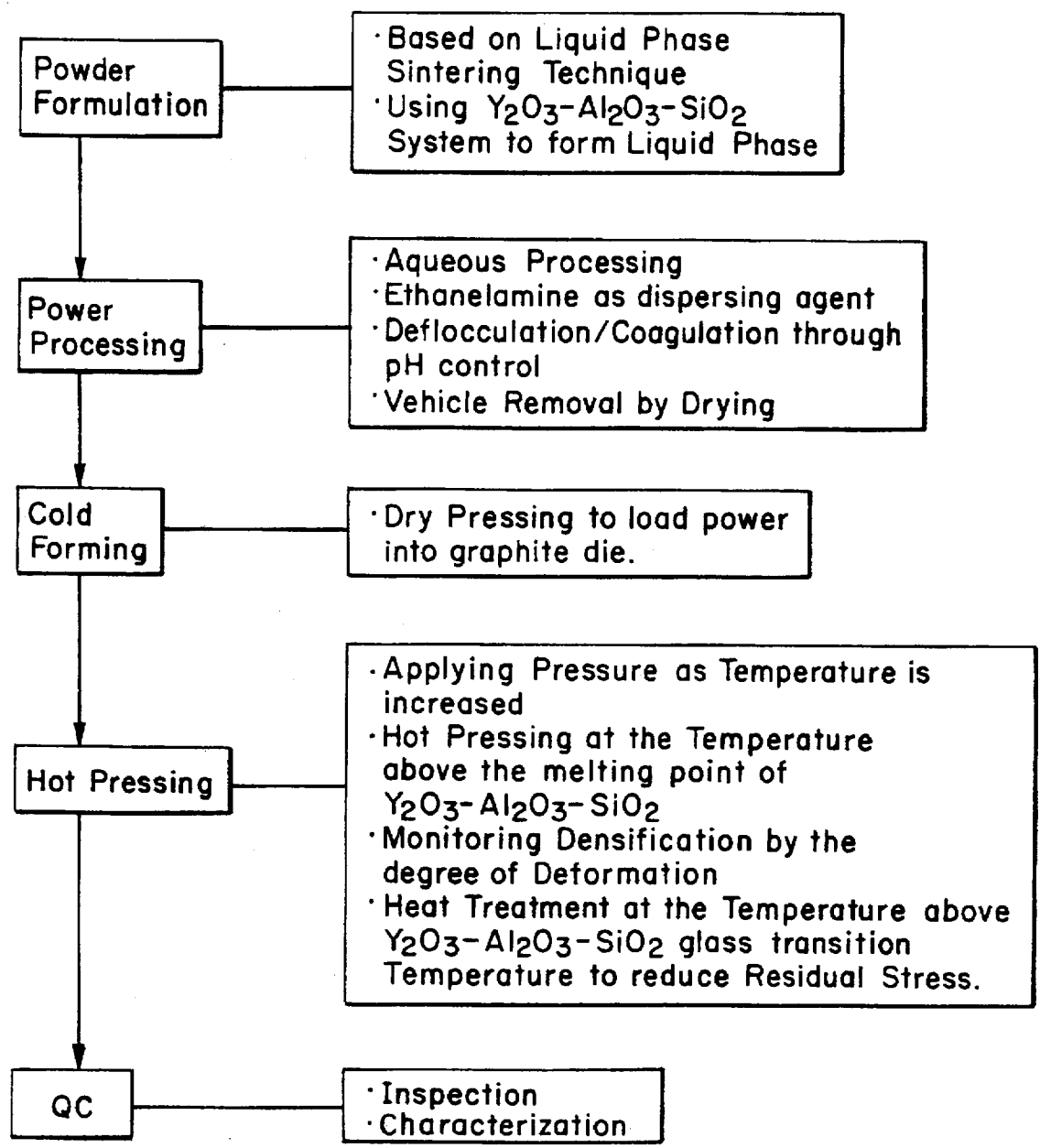

With reference to FIG. 11, the liquid phase sintering technique employed in FIG. 10 is also employed. However, mechanical energy as well as thermal energy are used in densification. Dry pressing is employed to load the powder into a graphite dye whereupon hot pressing is conducted at a temperature above the melting point of the $Y_2O_3$-$Al_2O_3$-$SiO_2$ liquid phase materials. Because mechanical energy is used to enhance densification kinetics, coarser powders (up to 4 micrometers average) and smaller amounts of densification aids can be used. Hot pressing also limits shape capability in that, by definition, dies are required during thermal processing and therefor only "simple" shapes are generally fabricated.

Following are examples of practice of the teachings of the present invention.

EXAMPLES 1–4

Commercially available ultra-fine alpha-type Silicon Carbide powder was used as the starting powder. This grade has an average particle size of 0.7 micrometers and the measured surface area of the particles was 15 m²/g. The % by weight of Silicon Nitride powder reinforcement for each of Examples 1–4 is displayed in Table II. This grade has an average particle size of 0.5 micrometers and the measured surface area was 13 m²/g. The Silicon Nitride powder consisted of 95% of alpha and 5% of beta structures. 3.4% by weight of Aluminum Oxide and 2.2% by weight of Yttrium Oxide were used as sintering aids. A eutectic composition of $Y_2O_3$ and $Al_2O_3$ was used, that is, 40% $Y_2O_3$ and 60% $Al_2O_3$. The Silicon Carbide, Silicon Nitride, Aluminum Oxide and Yttrium Oxide powders were blended in de-ionized water. Neoprene lined jar mills with $Si_3N_4$ grinding media were used to homogenize the batched powder. A time increment of 18 hours at a slurry viscosity of 50 centipose with pH of 8.5 produced a well dispersed powder blend. A small amount of Nitric Acid was added to flocculate the slurry to prevent the powder separation in drying. A time increment of 30 minutes at a slurry viscosity of 600 centipose with pH of 6.5 was conducted in this flocculation step. All powders were prepared for hot pressing by pan drying, dry milling and subsequent screening. Hot pressing was conducted at 3500 psi and at the temperature of 1775° C. Two hours of treatment at the ultimate hot pressing temperature was required to reach full density. An annealing at 1400° C. for 1 hour was performed during cooling to reduce the residual stress in Silicon Carbide. Polished and fractured samples were examined by optical and electron microscopy. The samples showed no evidence of porosity. The equiaxed fine-grained Silicon Carbide and in-situ growth Silicon Nitride whiskers can be identified. Fractured samples showed predominantly intergranular fracture. X-ray diffraction was used to confirm the presence of beta-type $Si_3N_4$.

Table II details the experimental results by listing density, fracture toughness, hardness and strength. The % by weight of $Si_3N_4$ particles which will be processed into in-situ grown whiskers may range, within the teachings of the present invention, from 1% to 50%.

TABLE II

Summary of EXAMPLES 1-4

| Example | Description | Density g/cm$^3$ | % of Theoretical Density | ** $K_{IC}$ MPa m$^{1/2}$ | + Hardness Kg/mm$^2$ | * Average Strength ksi (MPa) |
|---|---|---|---|---|---|---|
| 1 | Liquid Phase SiC with 0% Si$_3$N$_4$(p) | 3.24 | Greater than 99% | 4.8 | 2170 | 101 (696) |
| 2 | with 10% Si$_3$N$_4$(p) | 3.23 | Greater than 99% | 4.8 | 2070 | 94.7 (652) |
| 3 | with 20% Si$_3$N$_4$(p) | 3.21 | Greater than 99% | 5.4 | 2000 | 115.8 (798) |
| 4 | with 30% Si$_3$N$_4$(p) | 3.21 | Greater than 99% | 6.2 | 1970 | 130.2 (897) |
| Reference | Conventional SiC | 3.20 | Greater than 99% | 3.0 | 2950 | 60.0 (413) |
| Reference | Typical Si$_3$N$_4$ Pressureless Sintered | 3.28 | Greater than 99% | 5.5 | 1450 | 110 (790) |

*Measured 4 point bend
+Knoop 1 Kg load
**Vickers indentation

EXAMPLE 5

The material as processed in EXAMPLE 3, that is, 20% Si$_3$N$_4$(p) addition was subjected to a one hour heat treatment at 1875° C. in Nitrogen to enhance acicular beta-type Si$_3$N$_4$ development. Thereafter, heat treatment samples were mounted and polished and measured for fracture toughness using the same methodology employed in previous examples. Results show that a 10% (about) increase in toughness was achieved by post heat treating. That is, the average fracture toughness (Kic) measured 5.95 MPa m$^{1/2}$ for the heat treated sample, in contrast to 5.4 MPa m$^{1/2}$ for the EXAMPLE 3 material.

This example conclusively demonstrates that fracture toughness through grain growth enhancement can be significantly improved using post heat treatments. Full benefit of this procedure has not been determined, that is, experiments have not been conducted to determine optimum heat treat conditions.

EXAMPLE 6

Silicon Nitride reinforced Silicon Carbide matrix composite was made using commercially available ultra-fine Silicon Carbide and Silicon Nitride powders, having the surface area of 15 and 13 m$^2$/g, respectively. 10% by weight of Silicon Nitride powder was used as the reinforcement. 4.0% by weight of Aluminum Oxide and 3.0% by weight of Yttrium Oxide, a near-eutectic sintering aid composition, were used as sintering aids. The Silicon Carbide, Silicon Nitride, Aluminum Oxide and Yttrium Oxide powders were blended in de-ionized water. All powders were prepared for hot pressing by pan drying, dry milling and subsequent screening. Hot pressing was conducted at 3500 psi and at the temperature of 1725° C. for 130 minutes. An annealing at 1400° C. for 1 hour was performed during cooling to reduce the residual stress in Silicon Carbide. The samples showed no evidence of porosity. The samples were fully dense with a density of about 3.2 g/cm$^3$. Knoop hardness using 1 Kg loading was about 2000 Kg/mm$^2$. Fracture toughness measured using Vickers indentation was about 4.9 MPa m$^{1/2}$. The average flexural strength (MOR) was about 92 ksi. Weibull modulus was about 11 and the characteristic strength was about 97 ksi.

As such, an invention has been described in terms of ceramic materials and processes for their manufacture, which fulfill each and every one of the objects of the invention as set forth hereinabove and provide new and useful ceramic materials of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

We claim:

1. A Silicon Carbide ceramic material having a density greater than 99% of theoretical density and consisting essentially of Silicon Carbide and 1% to 50%, by weight, of uniformly dispersed in-situ Si$_3$N$_4$ reinforcements comprising whiskers.

2. The Silicon Carbide ceramic material of claim 1, having 10%, by weight, of said whiskers.

3. The Silicon Carbide ceramic material of claim 1, having 20%, by weight, of said whiskers.

4. The Silicon Carbide ceramic material of claim 1, having 30%, by weight, of said whiskers.

5. A Silicon Carbide ceramic material having a density greater than 99% theoretical density and comprising a silicon carbide matrix reinforced with uniformly dispersed Si$_3$N$_4$ reinforcing whiskers.

* * * * *